United States Patent
Mikame

(10) Patent No.: US 6,856,634 B2
(45) Date of Patent: Feb. 15, 2005

(54) LASER PROCESSING DEVICE AND LASER PROCESSING METHOD

(75) Inventor: Kazuhisa Mikame, Toyota (JP)

(73) Assignee: Toyota Jidoshi Kabushiki Kaisha, Toyota (JP)

( * ) Notice: Subject to any disclaimer, the term of this patent is extended or adjusted under 35 U.S.C. 154(b) by 0 days.

(21) Appl. No.: 10/257,718

(22) PCT Filed: Feb. 19, 2002

(86) PCT No.: PCT/JP02/01415

§ 371 (c)(1),
(2), (4) Date: Oct. 16, 2002

(87) PCT Pub. No.: WO02/066197

PCT Pub. Date: Aug. 29, 2002

(65) Prior Publication Data

US 2003/0150842 A1 Aug. 14, 2003

(30) Foreign Application Priority Data

Feb. 19, 2001 (JP) ......................................... 2001-041715

(51) Int. Cl.⁷ ............................ H01S 3/13; H01S 3/00; H01S 3/14; H01S 5/00
(52) U.S. Cl. ..................... 372/38.02; 372/1; 372/29.01; 372/29.012; 372/38.04; 372/43; 372/39; 372/68
(58) Field of Search ......................... 372/1, 8, 9, 29.01, 372/29.012, 29.015, 29.021, 38.1, 38.02, 38.04, 38.03, 38.07, 39, 43, 68, 19, 25, 34, 36, 75

(56) References Cited

U.S. PATENT DOCUMENTS 5,748,654 A * 5/1998 Marabella et al. ............. 372/19

5,925,271 A * 7/1999 Pollack et al. ......... 219/121.74

FOREIGN PATENT DOCUMENTS

| DE | 43 01 689 A1 | 7/1994 |
|----|----|----|
| JP | 61-199588 | 9/1986 |
| JP | 09337160 | * 7/1999 |
| JP | 2000-102886 | 4/2000 |
| JP | 2002-66779 | 3/2002 |
| WO | WO 94/17576 | 8/1994 |

\* cited by examiner

*Primary Examiner*—Minsun Oh Harvey
*Assistant Examiner*—Armando Rodriquez
(74) *Attorney, Agent, or Firm*—Burns, Doane, Swecker & Mathis, L.L.P.

(57) ABSTRACT

The present invention provides a laser machining apparatus in a simple structure which can properly carry out laser machining by irradiating a laser beam easily at a predetermined energy density to a machining-target site in a predetermined range, and in addition, which can be downsized and can be kept with easy maintenance and has enhanced durability.

The apparatus includes: a semiconductor stack 1 comprising a plurality of semiconductor laser elements; and a controller for controlling emission of the laser beam emitted from each of the semiconductor laser elements. The semiconductor stack 1 is divided into a plurality of blocks B11, B12, B13, B14 in correspondence with the machining-target site of a work piece. The controller controls the irradiation of the laser beam from each of the blocks B11, B12, B13, B14 to be changeable in terms of time.

22 Claims, 16 Drawing Sheets

FIG. 13
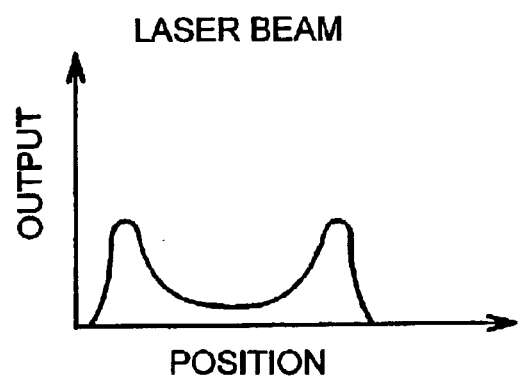
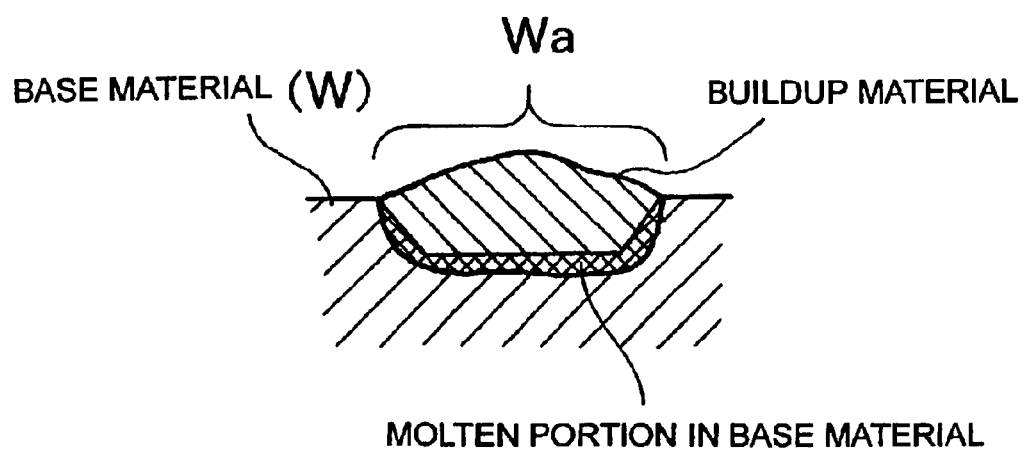

FIG. 25
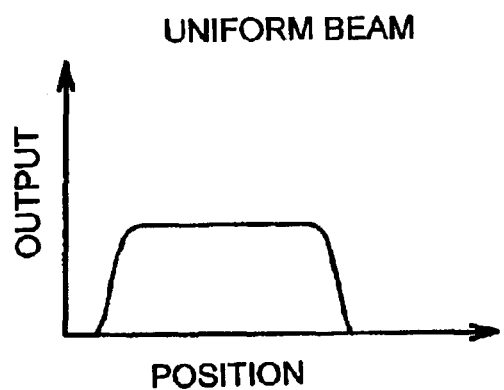
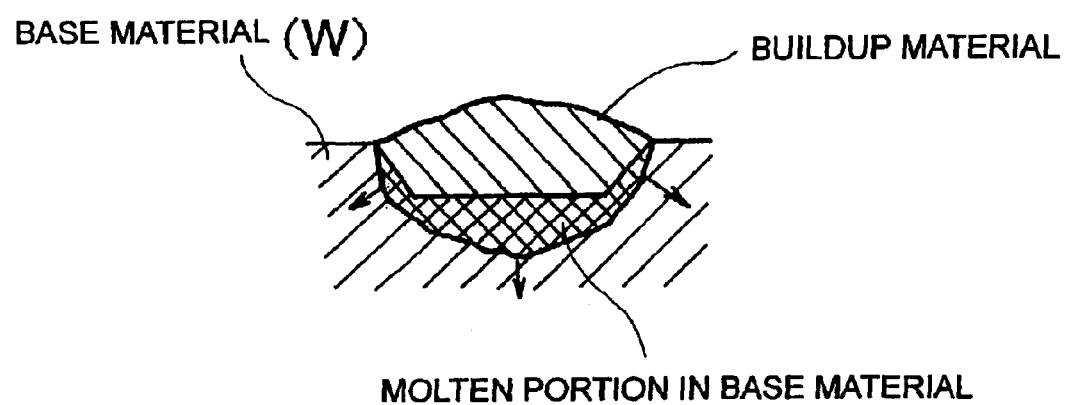

LASER PROCESSING DEVICE AND LASER PROCESSING METHOD

TECHNICAL FIELD

The present invention relates to a laser machining apparatus and a machining method therewith.

BACKGROUND ART

Machining such as a heat treatment including cutting, perforation, welding, cladding buildup and quenching has come to be carried out by irradiating a laser beam to a machining-target site of a work piece. In these various kinds of laser machining, in general, a YAG laser beam and a carbon dioxide gas laser have conventionally been employed.

When a YAG laser or a carbon dioxide gas laser is employed, in order to obtain an energy density and output corresponding to the laser machining, the emitted laser beam is reduced into a predetermined spot diameter by use of a condenser lens or a condenser reflecting mirror and then is irradiated to the machining-target site. Especially in welding, cladding buildup, quenching and the like where the machining-target site Wa in a predetermined range of a work piece W is machined without turning its state into a gaseous phase, a laser beam L with a reduced diameter is irradiated to the machining-target site Wa in the predetermined range of the work piece W. In addition, for such purpose as to prevent the machining-target site Wa from burn through or penetration and bulging at a center portion, scanning or oscillation is carried out (hereinafter, generally referred to as oscillation) in a state where the laser beam L is vibrated by vibrating a condenser lens 3 as shown in FIG. 21 or repetitively rotating a scanning mirror 4 as shown in FIG. 22.

FIG. 25 shows a case where cladding buildup in which a buildup material such as powder metal is deposited onto a base material is carried out by employing a conventional technique. A laser beam is irradiated to the buildup material at a uniform output. Further, FIG. 26 shows a case where aluminum plated steel sheets in each of which aluminum is plated onto a base material made of steel sheet are laminated and welded with each other in the state where their aluminum plated layers are attached to each other, by employing a conventional technique. In addition, FIG. 27 shows a case where zinc plated steel sheets in each of which zinc is plated onto a base material made of steel sheet are laminated and welded with each other in the state where their zinc plated layers are attached to each other, by employing a conventional technique.

Further, in recent years, as is disclosed in Japanese Patent Publication No. 2683158, various kinds of machining has come to be carried out by use of a semiconductor laser system. The laser system disclosed in Japanese Patent Publication No. 2683158 is a semiconductor laser system including a plurality of semiconductor laser units each having a laser oscillator. The semiconductor laser units generate laser radiation beams emitted therefrom. Each of the semiconductor laser units includes a plurality of groups of semiconductor laser units. The semiconductor laser units in each of the groups operate in the same basic mode in a horizontal direction and in the same mode in the longitudinal direction in order to generate laser radiation beams with the same wavelength, have an photoconduction single mode related to each of the semiconductor laser units, and have a connection element for connecting the laser beam emitted from each of the semiconductor lasers with one of the single-mode photoconduction fibers, respectively. The photoconduction fibers form a fiber bundle having an end surface, and the end surface includes fiber end surfaces which form the fiber bundle in order to render all of the fiber end surfaces that generate laser radiation beams with the same wavelengths into a radiation group. The radiation groups which generate laser radiation beams with different wavelengths from each other are then arranged on the end surface. A coherent laser radiation generated by each of the semiconductor laser units and emitted from the front end surface of the fiber bundle forms the entire laser radiation. The entire laser radiation irradiates a certain target surface of an object which is irradiated while all the semiconductor laser units are in operation, and a controller is provided so as to control each of the semiconductor laser units in a determined state. Since the light intensity of irradiation can be specified for each of the surface elements, it is possible to determine irradiation for each of different surface elements on the target surface.

Further, this Patent Publication discloses, for example, two irradiated surface portions having unique shapes which operate for pre-heating during alloy machining or for post-treatment, and an oval-shaped surface portion extending in parallel to the movement direction toward the axis in a length direction.

In other words, the laser system of this Patent Publication performs an ON/OFF control for each of the semiconductor laser units in order to specify the laser radiation in correspondence with each of the different surface elements on the target surface.

However, among the aforementioned conventional techniques, when specified machining is performed in the state where the laser beam L is oscillated within a specified range by employing a YAG laser or a carbon dioxide gas laser, precise control is required for vibrating the condenser lens 3 (FIG. 21) and for repetitively rotating the scanning mirror 4 (FIG. 22). In addition, since it is required to provide the laser machining apparatus with a mechanism for vibrating the condenser lens 3 or a mechanism for repetitively rotating the scanning mirror 4 (its illustration is omitted), the apparatus becomes complicated and large-sized as a whole, and maintenance for maintaining these mechanisms is also required. Further, the vibration given to the condenser lens and the repetitive rotation of the scanning mirror 4 make it difficult to enhance the durability of the laser machining apparatus.

Further, when cladding buildup is carried out as shown in FIG. 25, since the heat is hard to be released at a center area of the molten portion of the base material, the molten portion tends to grow large. On the contrary, the end portion thereof is cooled down easily because the heat is easily released. Therefore, if a laser beam is irradiated to the buildup material at a uniform output as described above, a difference in temperatures is caused. In this case, at the center area where the molten portion grows to be large, the base material is diluted and the composition of the buildup material changes. Especially in the case where the base material is made of copper and the buildup material is made of aluminum, if the base material is diluted and the composition of the buildup material changes, there arises a problem that the hardness increases and cracks are created in accordance with the difference in temperatures. The problem resulted from the difference in temperatures from portion to portion of the machining-target site due to the irradiation of the laser beam at a uniform output as described above arises not only in the cladding buildup but also in the heat treatment such as quenching and other types of machining.

Further, when the aluminum plated steel sheets are laminated and welded with each other as shown in FIG. 26, the aluminum plated layers in contact with each other are melted and an intermetallic compound of aluminum and iron is produced at the molten portions. Since the intermetallic compound thus produced has high hardness, there arises a problem that the molten portions become brittle.

Furthermore, when the zinc plated steel sheets are laminated and welded with each other as shown in FIG. 27, since the zinc plated layers have a low melting point, they are evaporated to produce bubbles. In this case, there arises a problem that the bubbles blow off at the rear of the welding pool in the machining direction (see the arrow in FIG. 27) and blowholes are created in the weld bead.

Meanwhile, in the laser system disclosed in the Patent Publication No. 2683158, laser radiation is merely emitted in correspondence with the different surface elements on the target surface by simply carrying out the ON/OFF control for each of the semiconductor laser units. When the work piece W is machined by changing the state of the machining-target site Wa of the work piece W into a liquid phase without oscillation such as that performed in the case where the YAG laser or the carbon dioxide gas laser is employed as mentioned above, the machining-target site Wa is melted without being stirred and then is re-solidified. Therefore, as shown in FIGS. 23 and 24, a delay G in re-solidification is partially produced at the rear in the machining direction. In this case, a crack C similar to a shrinkage cavity or a blowhole may be produced in the bead Y. For this reason, the laser system disclosed in this Patent Publication also requires an installation of a laser oscillator to the semiconductor laser units, as is the aforementioned case where the YAG laser or the carbon dioxide gas laser is employed. In this case, precision is required for control, and the system becomes complicated and large-sized, and maintenance is required. In addition, it is difficult to increase the durability of the system.

The present invention has been made in view of the problems described above, and an object thereof is to provide a laser machining apparatus in a simple structure which can properly carry out laser machining by irradiating a laser beam easily and precisely at a predetermined energy density and output as well as in a predetermined time duration to a machining-target site in a predetermined range, and in addition, which can be downsized and can be kept with easy maintenance and has enhanced durability.

In addition, another object of the present invention is to provide a method for properly carrying out laser machining by irradiating a laser beam at a predetermined energy density and output as well as in a predetermined time duration to a machining-target site in a predetermined range in a simple control.

DISCLOSURE OF THE INVENTION

An invention related to a laser machining apparatus of claim 1 is characterized by including, in order to achieve the object stated above, a semiconductor stack including a plurality of semiconductor laser elements and divided into a plurality of blocks; and a controller for controlling an irradiation output of a laser beam from each of the blocks so as to be changeable in terms of time.

An invention related to a laser machining apparatus of claim 2 is characterized in that, in order to achieve the object stated above, according to the invention as set forth in claim 1, the semiconductor stack is divided into a block which continuously irradiates a laser beam and a block of which irradiation output of laser beam is changed in terms of time.

An invention related to a laser machining apparatus of claim 3 is characterized in that, in order to achieve the object stated above, according to the invention as set forth in claim 2, the blocks of which respective irradiation output of laser beam is changed in terms of time are arranged around the block which continuously irradiates a laser beam.

An invention related to a laser machining apparatus of claim 4 is characterized in that, in order to achieve the object stated above, according to the invention as set forth in claim 2, the block which continuously irradiates a laser beam is disposed in front and at rear in a machining direction, respectively.

Further, an invention related to a laser machining method of claim 5 is characterized in that, in order to achieve the object stated above, a semiconductor stack including a plurality of semiconductor laser elements is divided into a plurality of blocks and an irradiation output of a laser beam emitted from each of the blocks is changed in terms of time.

An invention related to a laser machining method of claim 6 is characterized in that, in order to achieve the object stated above, according to the invention as set forth in claim 5, the irradiation output of the laser beam emitted from each of the blocks is sequentially changed between the adjacent blocks.

An invention related to a laser machining method of claim 7 is characterized in that, in order to achieve the object stated above, according to the invention as set forth in claim 6, the irradiation output of a block which irradiates a laser beam to the side edge in the machining direction is set high.

An invention related to a laser beam machining method of claim 8 is characterized in that, in order to achieve the object stated above, according to the invention as set forth in claim 6, the irradiation time duration of a block which irradiates a laser beam to the side edge in the machining direction is set long.

An invention related to a laser beam machining method of claim 9 is characterized in that, in order to achieve the object stated above, according to the invention as set forth in claim 5, a block which continuously irradiates a laser beam is disposed in front and at rear in the machining direction, respectively, and the irradiation output of the block disposed at the rear in the machining direction is set low.

An invention related to a laser machining method of claim 10 is characterized in that, in order to achieve the object stated above, according to the invention as set forth in any one of claims 5 to 9, the laser machining is buildup machining where a buildup material is build up onto a base material.

An invention related to a laser machining method of claim 11 is characterized in that, in order to achieve the object stated above, according to the invention as set forth in any one of claims 5 to 9, the laser machining is welding where sheet-like materials each including a plated base material are welded with each other.

An invention related to a laser machining method of claim 12 is characterized in that, in order to achieve the object stated above, according to the invention as set forth in claim 11, the sheet-like material is an aluminum plated steel sheet.

An invention related to a laser machining method of claim 13 is characterized in that, in order to achieve the object stated above, according to the invention as set forth in claim 11, the sheet-like material is a zinc plated steel sheet.

In the invention of claim 1, the controller controls the output of the laser beam emitted from each of the semiconductor laser elements of the semiconductor stack to the machining-target site in a predetermined range so that the output is changed for each of the divided blocks in a predetermined order by an ON/OFF control or an intensity varying control, a control for elongating and shortening the irradiation time duration, or a control in combination thereof As a result, the machining-target site of the work piece can be precisely and properly machined within a predetermined range. When the state of the machining-target site is changed into a liquid phase, a stirring effect is generated in the machining-target site by changing the irradiation of the laser beam in terms of time. In this manner, the occurrence of a partial delay in solidification is suppressed and the machining-target site is uniformly re-solidified, thereby suppressing the generation of blowholes and cracks. In addition, when the irradiation output of the laser beam is sequentially changed between the adjacent blocks, the laser beam is irradiated to the machining-target site in an oscillating manner.

In the invention of claim 2, according to the invention as set forth in claim 1, the output of the block which continuously irradiates a laser beam is changed into a constant output or a predetermined output by the intensity varying control. In addition, the output of the block of which irradiation output of the laser beam is changed in terms of time is changed by the ON/OFF control or the intensity varying control, the control for elongating and shortening the irradiation time duration, or a control in combination thereof.

In the invention of claim 3, according to the invention as set forth in claim 2, the irradiation output of each of the blocks disposed around the block which continuously irradiates a laser beam is changed in terms of time.

In the invention of claim 4, according to the invention as set forth in claim 2, the blocks of which respective irradiation output of the laser beam is changed in terms of time are disposed around the blocks, including the area therebetween, which are disposed in front and at rear in the machining direction and continuously irradiate a laser beam, respectively.

Further, in the invention of claim 5, when the laser beam is irradiated in such a manner that its output is changed for each of the divided blocks in the semiconductor stack in a predetermined order by an ON/OFF control or an intensity varying control, a control for elongating and shortening the irradiation time duration, or a control in combination thereof, the machining-target site of the work piece can be machined properly within a predetermined range. When the state of the machining-target site is changed into a liquid phase, a stirring effect is generated in the machining-target site by changing the irradiation output of the laser beam in terms of time. In this manner, a partial delay in solidification is suppressed and the machining-target site is uniformly re-solidified. As a result, the generation of blowholes or cracks is suppressed.

In the invention of claim 6, according to the invention as set forth in claim 5, the irradiation output of the laser beam emitted from each of the blocks is sequentially changed between the adjacent blocks, and thereby the laser beam is irradiated to a predetermined range of the machining-target site in an oscillating manner.

In the invention of claim 7, according to the invention as set forth in claim 6, the irradiation output of the block which irradiates the laser beam to the side edge in the machining direction is set high, thereby forming the machined portion to be uniform in the width direction.

In the invention of claim 8, according to the invention as set forth in claim 6, the irradiation time duration of the block which irradiates the laser beam to the side edge in the machining direction is set long, thereby forming the machined portion to be uniform in the width direction.

In the invention of claim 9, according to the invention as set forth in claim 5, the block which continuously irradiates a laser beam is disposed in front and at rear in the machining direction, respectively, and the laser beam is emitted at a low output from the block disposed at the rear in the machining direction. In this manner, a stirring effect is assuredly generated at the rear in the molten pool, and a partial delay in solidification is suppressed and the molten pool is uniformly re-solidified. As a result, the generation of blowholes or cracks is suppressed.

In the invention of claim 10, according to the invention as set forth in any one of claims 5 to 9, the laser beam is properly irradiated to exert a stirring effect. In this manner, buildup machining for building up a buildup material onto a base material is properly carried out without generating any cracks.

In the invention of claim 11, according to the invention as set forth in any one of claims 5 to 9, the laser beam is properly irradiated to exert a stirring effect. In this manner, a welding for welding sheet-like materials, each including a plated base material, with each other is properly carried out without generating an intermetallic compound and a blowhole.

In the invention of claim 12, according to the invention as set forth in claim 11, the laser beam is properly irradiated to exert a stirring effect. In this manner, welding for welding sheet-like materials, which are aluminum plated steel sheets, with each other is properly carried out without generating an intermetallic compound.

In the invention of claim 13, according to the invention as set forth in claim 11, the laser beam is properly irradiated to exert a stirring effect. In this manner, welding for welding sheet-like materials, which are zinc plated steel sheets, with each other is properly carried out without generating a blowhole.

BRIEF DESRIPTION OF THE DRAWINGS

FIG. 13 is a graph showing an output of a laser beam irradiated as a result of the control shown in FIG. 12 and a cross-sectional view for illustrating the state where cladding buildup is properly carried out by this control.

FIG. 25 is a diagram for illustrating an output of a laser beam which is oscillated so as to be uniformly irradiated according to a prior art and a case where cladding buildup is carried out by employing the laser beam.

BEST MODE FOR CARRYING OUT THE INVENTION

Figure 1:
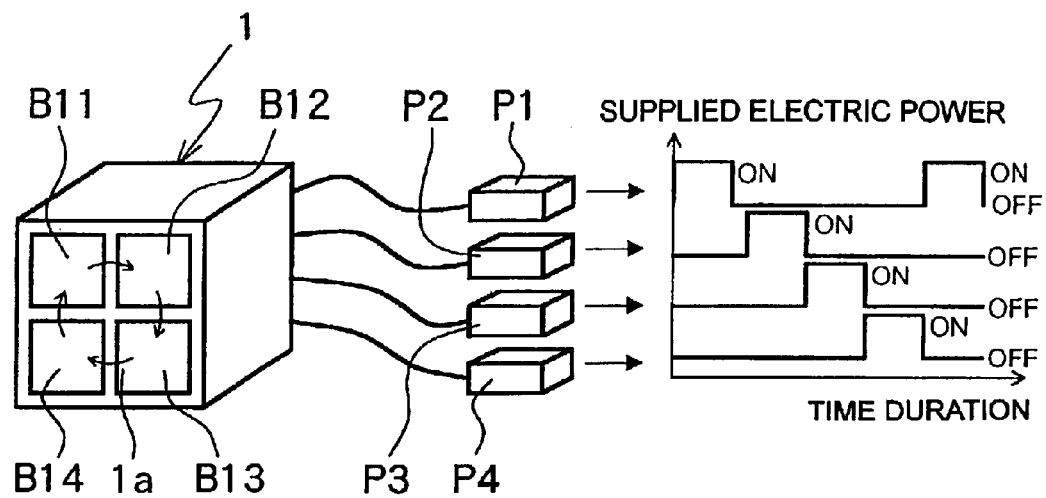
FIG. 1 is a conceptual diagram for illustrating an embodiment of a laser machining apparatus of the present invention and details of the control performed thereby.

First, an embodiment of the laser machining apparatus of the present invention will be described in detail mainly based on FIG. 1. In the drawings, identical reference numerals and symbols denote the same or corresponding constituent elements.

The laser machining apparatus of the present invention generally includes: a semiconductor stack (or also referred to as a semiconductor laser module) 1 including a plurality of semiconductor laser elements (their illustration is omitted); and a controller (although its illustration is omitted, its function will be described later) for controlling emission of the laser beam emitted from each of the semiconductor laser elements. The semiconductor stack 1 is divided into a plurality of blocks B11, B12, B13, B14 in correspondence with the machining-target site Wa of a work piece W. The controller controls the irradiation of the laser beam from each of the blocks B11, B12, B13, B14 to be changeable in terms of time.

Each of the semiconductor laser elements emits a laser beam at a predetermined energy density from one end surface thereof when electric power is supplied thereto. The output and irradiation time duration of the emitted laser beam can be arbitrarily changed by changing the magnitude of the electric power to be supplied or the time duration for supplying the electric power. In the semiconductor stack 1, the semiconductor laser elements are arranged in such a manner that their end surfaces emitting the laser beam are arranged in a line to constitute a semiconductor bar (its illustration is omitted). The semiconductor stack 1 is constituted by accumulating a plurality of semiconductor bars. The semiconductor stack 1 can be formed into an arbitrary shape by arranging a plurality of semiconductor laser elements into a matrix. In the embodiment shown in FIG. 1, for easy understanding of the present invention, illustrated is a state where the semiconductor laser elements are laminated such that the end surface 1a of the semiconductor stack 1 for emitting the laser beam has a substantially rectangular shape and the end surface 1a thus shaped is divided into four rectangular blocks B11, B12, B13, B14 having substantially equal sizes (areas) with each other. However, the present invention is not limited to the embodiment illustrated in the drawings, and the shapes of the end surface 1a of the semiconductor stack 1 for emitting the laser beam and the blocks B11, B12, B13, B14 obtained by dividing the end surface 1a, and the number of blocks obtained by dividing the end surface 1a may be arbitrarily determined in accordance with the shape of the machining-target site Wa of the work piece W.

If necessary, a condenser lens 3 (see FIG. 5) is provided between the end surface 1a of the semiconductor stack 1 for emitting the laser beam and the machining-target site Wa of the work piece W, in order to irradiate the emitted laser beam to the machining-target site Wa at a predetermined focus point.

Figure 21:
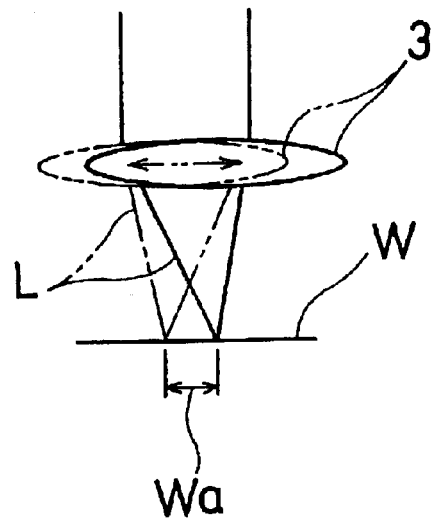
FIG. 21 is a diagram for illustrating a prior art where a condenser lens is vibrated so as to oscillate a laser beam.
Figure 22:
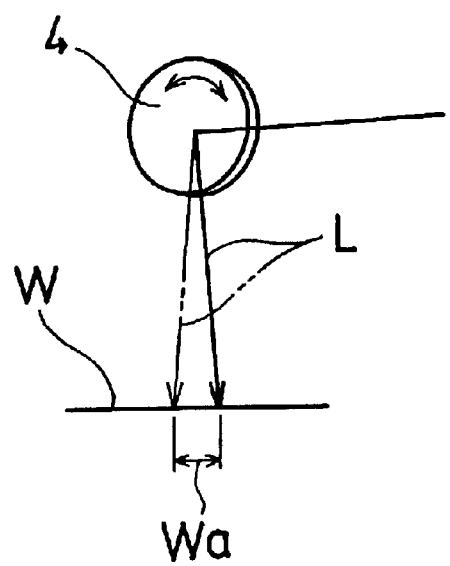
FIG. 22 is a diagram for illustrating a prior art where a scanning mirror 4 is repetitively rotated so as to oscillate a laser beam.

In this embodiment, power sources P1, P2, P3, P4 for supplying electric power are correspondingly connected to the divided blocks B11, B12, B13, B14, respectively. The controller, whose illustration is omitted, controls the electric power to be supplied from the respective power sources P1, P2, P3, P4 to the respective blocks B11, B12, B13, B14 in such a manner that the electric power is changed in accordance with the elapse of time. As a result, the output of the laser beam emitted from the semiconductor stack 1 is changed in terms of time in order of the adjacent blocks B11, B12, B13, B14, B11 and so forth. Therefore, in the laser machining apparatus of the present invention a laser beam with a proper energy density can be easily irradiated to the machining-target site Wa of the work piece W in the state where the laser beam is rotated in an oscillating manner (in this embodiment), without employing a mechanism for vibrating the condenser lens (FIG. 21) or a mechanism for repetitively rotating the scanning mirror 4 (FIG. 22) as those employed in the prior arts. Consequently, a specified laser machining can be stably carried out. In addition, the structure of the laser machining apparatus can be simplified for downsizing and the durability of the apparatus can be enhanced.

In the laser machining apparatus thus structured, the electric power to be supplied to each of the blocks is adjusted depending on the intended machining, for example, machining such as welding and cladding where the state of the machining-target site Wa of the work piece W is changed into a liquid phase, a heat treatment such as quenching and annealing, machining such as marking where the state of the machining-target site Wa of the work piece W is not changed into a liquid phase, or machining where the state of the machining-target site Wa of the work piece W is changed into a gaseous phase and then is evaporated. In this manner, the laser beam can be irradiated at an output required for the intended machining. In addition, the range where the laser beam can be irradiated can be determined in accordance with the sizes of the laminated and molded semiconductor stack 1 and the divided blocks B11, B12, B13, B14.

Next, the laser machining method of the present invention will be described in detail based on FIGS. 1 to 6, as to the case where welding is carried out by employing the laser machining apparatus structured as described above.

In the laser machining method of the present invention, generally, the semiconductor stack 1 including a plurality of semiconductor laser elements is divided into a plurality of blocks B11, B12, B13, B14, and the irradiation output of the laser beam L emitted from each of the blocks B11, B12, B13, B14 is controlled so as to change in terms of time, and in addition, the irradiation output of the laser beam L is controlled so as to sequentially change between the adjacent blocks B11, B12, B13, B14.

First, the end surface 1a of the semiconductor stack 1 for emitting the laser beam is arranged so as to oppose to the machining-target site Wa of the work piece W. Between the machining-target site Wa and the end surface 1a of the semiconductor stack 1, if necessary, a condenser lens 3 is adjusted and disposed in such a manner that the laser beam L with a predetermined converging diameter can be irradiated. The semiconductor stack 1 of the embodiment shown in FIG. 1 is divided in such a manner that the blocks B11 and B12, B12 and B13, B13 and B14, and B14 and B11 are adjacent to each other, as described above.

In this state, electric power of a predetermined magnitude is supplied from the power sources P1, P2, P3, P4 to the corresponding blocks B11, B12, B13, B14 by the controller at predetermined timings, and at the same time, the machining-target site Wa and the semiconductor stack 1 are relatively moved along the welding direction. At this time, the controller performs control in such a manner that the electric power supplied is sequentially changed between the adjacent blocks B11, B12, B13, B14 in accordance with the elapse of time. The embodiment of the control will be described hereinafter.

In the embodiment shown in FIG. 1, the control is carried out such that electric power is supplied (ON) to one of the blocks B11, B12, B13, B14 sequentially from the power sources P1, P2, P3, P4, in such a manner that the laser beam L is sequentially emitted from only one of the blocks B11, B12, B13, B14, B11 and so forth in accordance with the elapse of time, whereas the supply of electric power to the remaining blocks is stopped (OFF).

Figure 2:
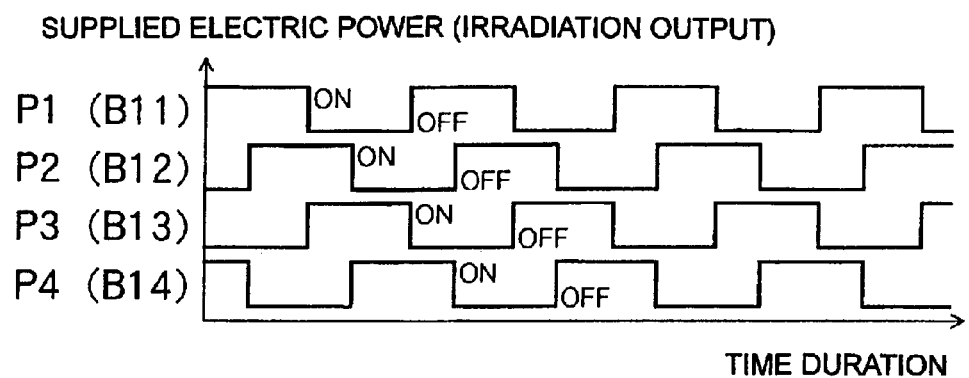
FIG. 2 is a graph showing details of the control in another embodiment.

In the embodiment shown in FIG. 2, the control is carried out such that electric power is sequentially supplied from the power sources P1, P2, P3, P4 to the corresponding adjacent blocks B11, B12, B13, B14 in an overlapped manner in such a manner that the laser beam is sequentially emitted from a plurality of adjacent blocks B11 and B12, B12 and B13, B13 and B14, B14 and B11 and so forth in an overlapped manner in accordance with the elapse of time, whereas the supply of electric power to the remaining blocks is stopped (OFF). The respective control shown in FIGS. 1 and 2 is referred to as an ON/OFF control.

Figure 3:
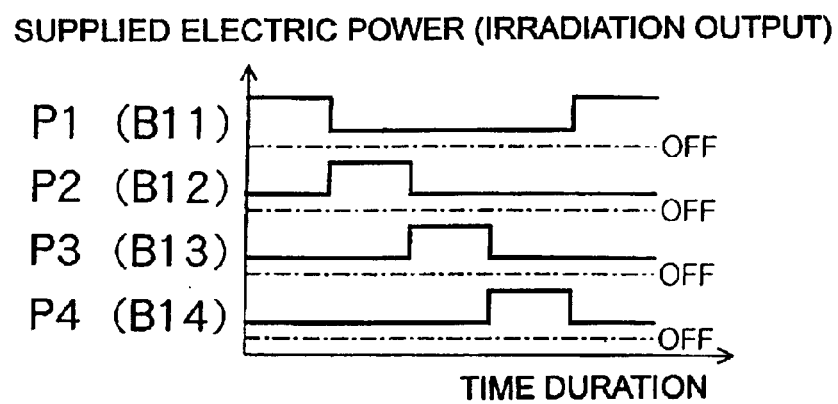
FIG. 3 is a graph showing details of the control in still another embodiment.
Figure 4:
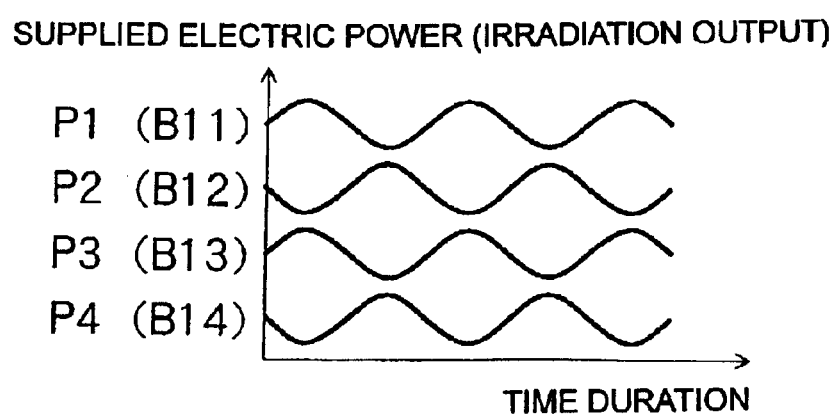
FIG. 4 is a graph showing details of the control in still another embodiment.

In the embodiment shown in FIG. 3, the control is carried out such that electric power of a constant magnitude is supplied to each of the blocks B11, B12, B13, B14 without turning off the electric power supplied from the power sources P1, P2, P3, P4, and the magnitude of the supplied electric power is increased in order of blocks B11, B12, B13, B14, B11, and so forth. Therefore, in this embodiment, a laser beam L at an output of constant level or larger is always emitted from each of the blocks B11, B12, B13, B14, and the output of the laser beam emitted from one of the blocks B11, B12, B13, B14 is increased in accordance with the elapse of time. The control shown in FIG. 3 is referred to as an intensity varying control.

In the embodiments shown in FIGS. 1 to 3, the supplied electric power (that is, the irradiation output) is controlled in the rectangular waveform. On the contrary, in the embodiment shown in FIG. 4, the electric power supplied from the respective power sources P1, P2, P3, P4 to the corresponding blocks B11, B12, B13, B14 is controlled in such a manner that the electric power is sequentially increased and decreased gradually in accordance with the elapse of time so that the electric power depicts a sine curve or a free waveform. When the waveform of the graph shown in this embodiment is at the lowest level (at the bottom level), if necessary, it is possible to perform control where the electric power to be supplied is turned off as is the case of the ON/OFF control shown in FIGS. 1 and 2. In addition, it is also possible to perform control where the supply of electric power of a predetermined magnitude or larger is continued without turning off the supplied electric power as is the case of the intensity varying control shown in FIG. 3.

The present invention also includes controls where the magnitude of the electric power to be supplied from the power sources P1, P2, P3, P4 to the blocks B11, B12, B13, B14 and/or time duration for the supply thereof are different from those of the embodiments shown in FIGS. 1 to 4 if necessary, as long as the irradiation output of the laser beam emitted from each of the blocks B11, B12, B13, B14 is controlled so as to change in terms of time.

Figure 5:
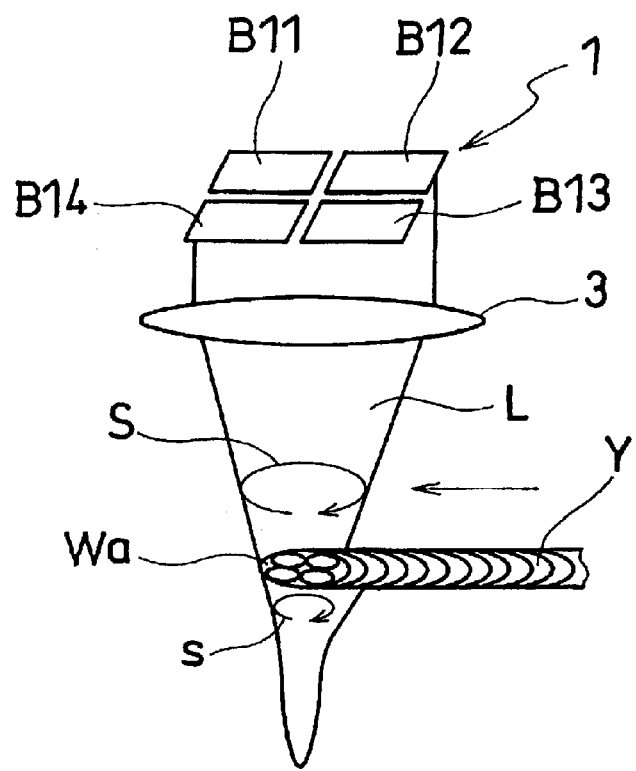
FIG. 5 is a conceptual diagram for illustrating a state where welding is carried out by oscillating the laser beam in a rotating manner by use of the laser machining apparatus of the present invention.
Figure 6:
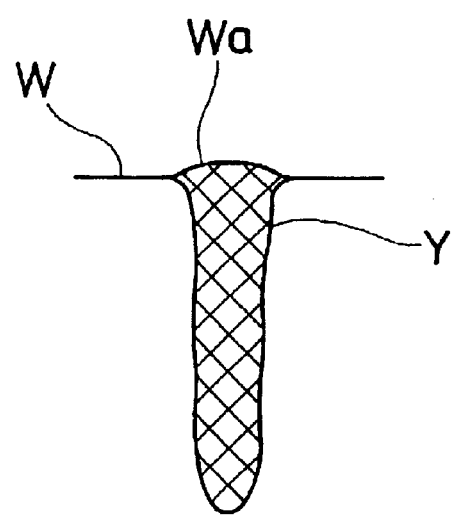
FIG. 6 is a cross-sectional view of an excellent bead formed at a machining-target site shown in FIG. 5.
Figure 23:
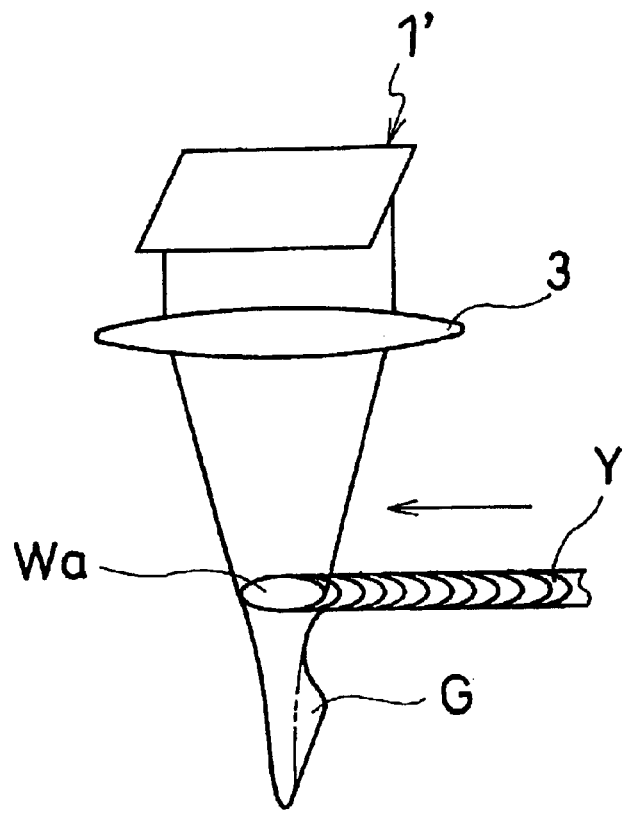
FIG. 23 is a diagram for illustrating that, in a case where the state of the machining-target site of a work piece is changed into a liquid phase without oscillating a laser beam and then machined, a delay in solidification partially occurs.
Figure 24:
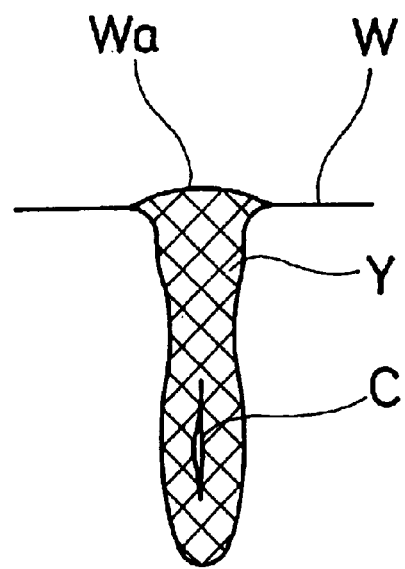
FIG. 24 is a cross-sectional view of a bead produced with a crack at the machining-target site shown in FIG. 23.

As described above, the electric power supplied from the respective power sources P1, P2, P3, P4 to each of the blocks B11, B12, B13, B14 is controlled so as to change in terms of time. In this manner, as shown in FIG. 5, the position irradiated with the laser beam (in the case of ON/OFF control) or the position irradiated with the laser beam at a large irradiation output (in the case of the intensity varying control) is moved in a rotating manner (along the arrow S in FIG. 5) in accordance with the elapse of time in this embodiment, such that the laser beam L oscillates within the range where the laser beam L can be irradiated by all of the blocks B11, B12, B13, B14. As a result, the laser beam L with a proper energy density is irradiated to the machining-target site Wa of the work piece W at a proper output. Therefore, when the machining-target site Wa of the work piece W is welded, a position in the machining-target site Wa where its state is changed into a liquid phase and is then re-solidified is sequentially moved (along the arrow s in FIG. 5) in accordance with the movement of the position irradiated with the laser beam L or the position irradiated with the laser beam L at a large irradiation output. Then, the material which has been changed into a liquid phase receives a stirring effect in such a manner that it is vibrated. In this manner, the occurrence of the delay in solidification (the reference symbol G in FIG. 23) which has been caused in the prior arts can be suppressed, thereby eliminating the crack like a shrinkage cavity (the reference symbol C in FIG. 24) or a blowhole. As a result, it is possible to produce an excellent bead Y with no defect in welding, also as shown in FIG. 6.

Next, another embodiment of the present invention will be described. The same or corresponding constituent elements as of the aforementioned embodiment will be denoted by the same reference numerals and symbols and their description will be omitted, and only the different constituent elements will be described.

Figure 7:
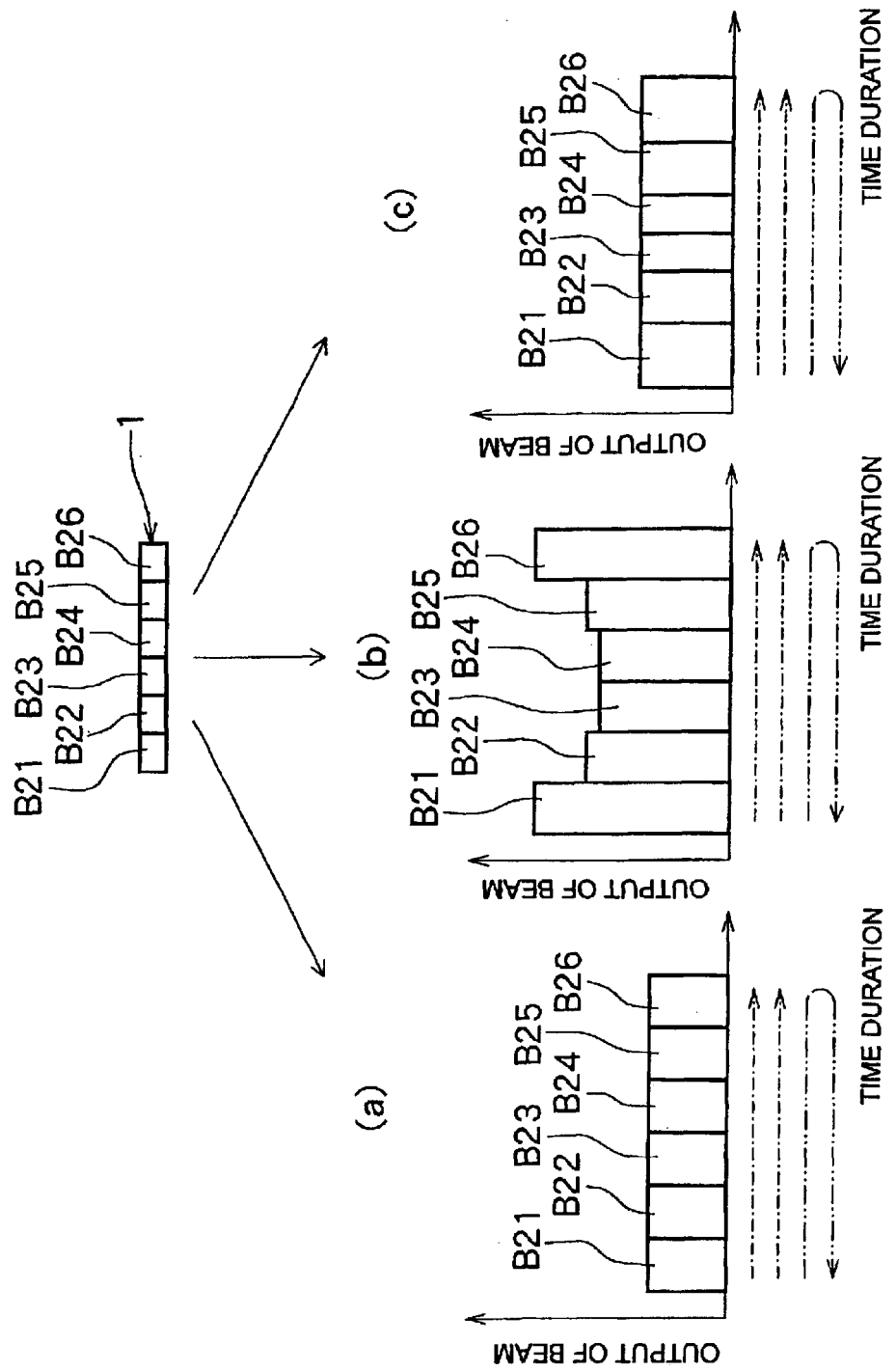
FIG. 7 is a conceptual diagram for illustrating another embodiment of a semiconductor stack of the laser welding apparatus of the present invention and a modified embodiment of the control performed thereby.

In an embodiment shown in FIG. 7, a semiconductor stack 1 is formed in accordance with the width of a machining-target site Wa, and is divided into blocks B21 to B26 in such a manner that the blocks are arranged in a line along a width direction of the semiconductor stack 1. Further, a controller controls the electric power to be supplied to each of the blocks B21 to B26 in such a manner that the output of a laser beam L irradiated is sequentially changed in terms of time in order of the adjacent blocks B21, B22, B23, B24, B25, B26 so that it oscillates. In this state, the semiconductor stack 1 and the machining-target site Wa of the work piece W are relatively moved so as to carry out a predetermined machining.

At this time, if necessary, the supply of electric power may be controlled in such a manner that the electric power is supplied in a single direction in order of the arranged blocks B21, B22, B23, B24, B25, B26, B21 and so forth as shown by an arrow of an alternate long and short dash line in each of (a), (b), and (c) of FIG. 7. Alternatively, the supply of electric power may also be controlled in such a manner that the electric power is supplied reciprocally in order of the blocks B21, B22, B23, B24, B25, B26, B25 and so forth, as shown by an arrow of alternate long and two short dashes line. Further, the magnitude (intensity) of the output of the laser beam L emitted from each of the blocks B21 to B26 can be set at an identical level to each other if necessary as shown in FIG. 7(a). Alternatively, as shown in FIG. 7(b), the magnitude (intensity) of the output of the laser beam L may be set so as to be varied depending on the positions along the width direction of the machining-target site Wa, for example, in such a manner that it is gradually increased from the center blocks B22 to B25 toward at least the block 21 at one end and/or B26. In addition, the time duration for emitting the laser beam L from each of the blocks B21 to B26 may be set so as to be varied depending on the positions along the width direction of the machining-target site Wa, for example, in such a manner that the time duration is set to be longer in at least the block B21 at one end and/or B26 and to be shorter in the center blocks B23, B24, as shown in FIG. 7(c).

Figure 8:
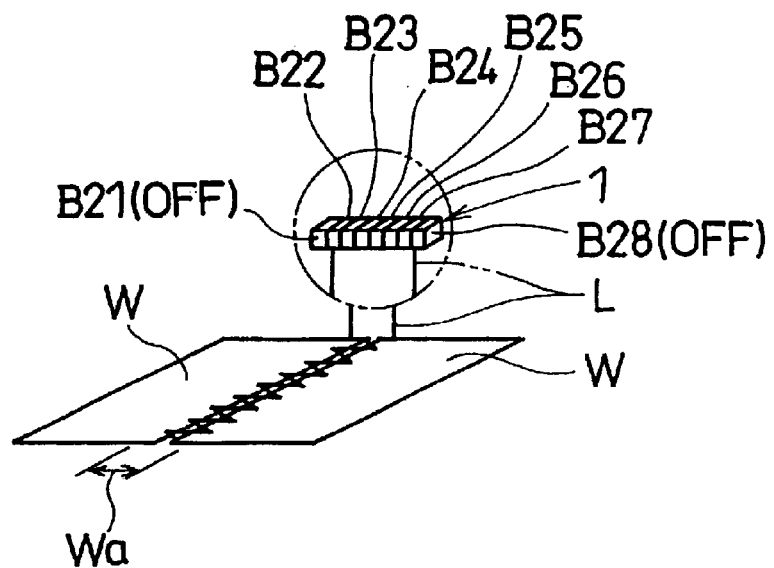
FIG. 8 is a perspective view for illustrating another embodiment of a semiconductor stack of the laser welding apparatus of the present invention and a state where welding is carried out.

In an embodiment shown in FIG. 8, a semiconductor stack 1 is formed so as to have a width equal to or larger than the maximum possible width of the machining-target site Wa of the various types of work pieces W, and is divided into identical widths in such a manner that six blocks B21 to B28 are arranged in a line along a width direction of the semiconductor stack 1. On the other hand, the width of the machining-target site Wa shown in FIG. 8 is narrower than the width of the semiconductor stack 1, and is equal to the total width of the six blocks among the blocks B21 to B28. Therefore, the blocks B21 and B28 at the both ends or the blocks B21 and B22 or the blocks B27, 28 at either end are not provided with the electric power from the corresponding power sources (OFF), and the laser beam is controlled such that the laser beam is emitted from the remaining blocks corresponding to the machining-target site Wa in such a manner that the output of the laser beam is changed in terms of time. Further, if necessary, when the control where the magnitude of the irradiation output and/or the irradiation time duration of the laser beam L is changed depending on the positions of the blocks B21 to B28 in the width direction as shown in (a), (b), and (c) of FIG. 7 is also performed together with the aforementioned control, in the case where two sheet-like materials are welded with each other as the work pieces W for example, it is possible to cope with the different widths of the machining-target site Wa, of which the difference is due to a gap and the like between the sheet-like materials W, W.

Figure 9:
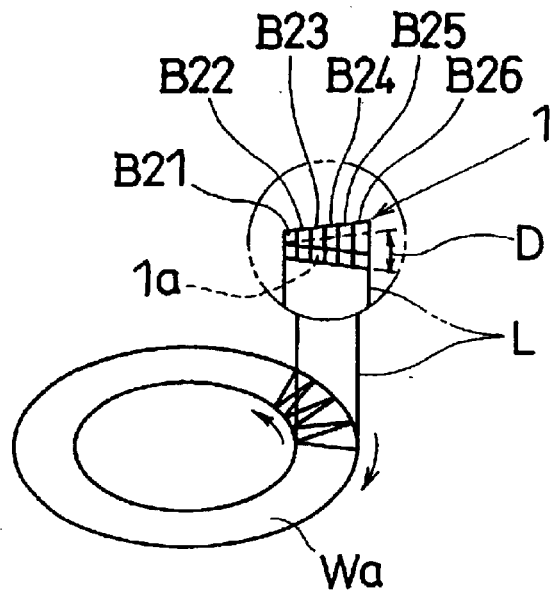
FIG. 9 is a perspective view for illustrating still another embodiment of a semiconductor stack of the laser welding apparatus of the present invention and a state where cladding buildup is carried out.

In an embodiment shown in FIG. 9, a clad powder material is disposed into the shape of ring with a relatively large width as a buildup material onto a machining-target site Wa, and a semiconductor stack 1 and the machining-target site Wa are structured in such a manner that they are moved so as to relatively circulate. The semiconductor stack 1 is divided into a plurality of blocks B21 to B26 in such a manner that the blocks are arranged in a line along a width direction of the semiconductor stack 1, that is, a radial direction of the ring-shaped machining-target site Wa. The semiconductor stack 1 may be formed into the shape of fan or trapezoid in such a manner that a depth D of an end surface 1 for emitting a laser beam is increased toward the block located at the outermost periphery, depending on the length of the machining-target site Wa in its circumferential direction. Further, the magnitude of the electric power to be supplied to each of the blocks B21 to B26 and/or the time duration for the supply thereof may be controlled in such a manner that the irradiation output of the laser beam becomes larger and/or the irradiation time duration becomes longer toward the block located at the outermost periphery, depending on the length of the machining-target site Wa in its circumferential direction.

With the structure described above, when the output of the laser beam emitted from each of the blocks B21 to B26 is changed so as to oscillate in the width (radial) direction of the machining-target site Wa in accordance with the elapse of time in the state where the semiconductor stack 1 and the machining-target site Wa are moved so as to relatively circulate, the clad powder material disposed on the ring-shaped machining-target site is irradiated with the laser beam L at a proper output and receives a stirring effect so as to be vibrated, regardless of its position in the radial direction. As a result, a properly buildup clad layer is formed.

Figure 10:
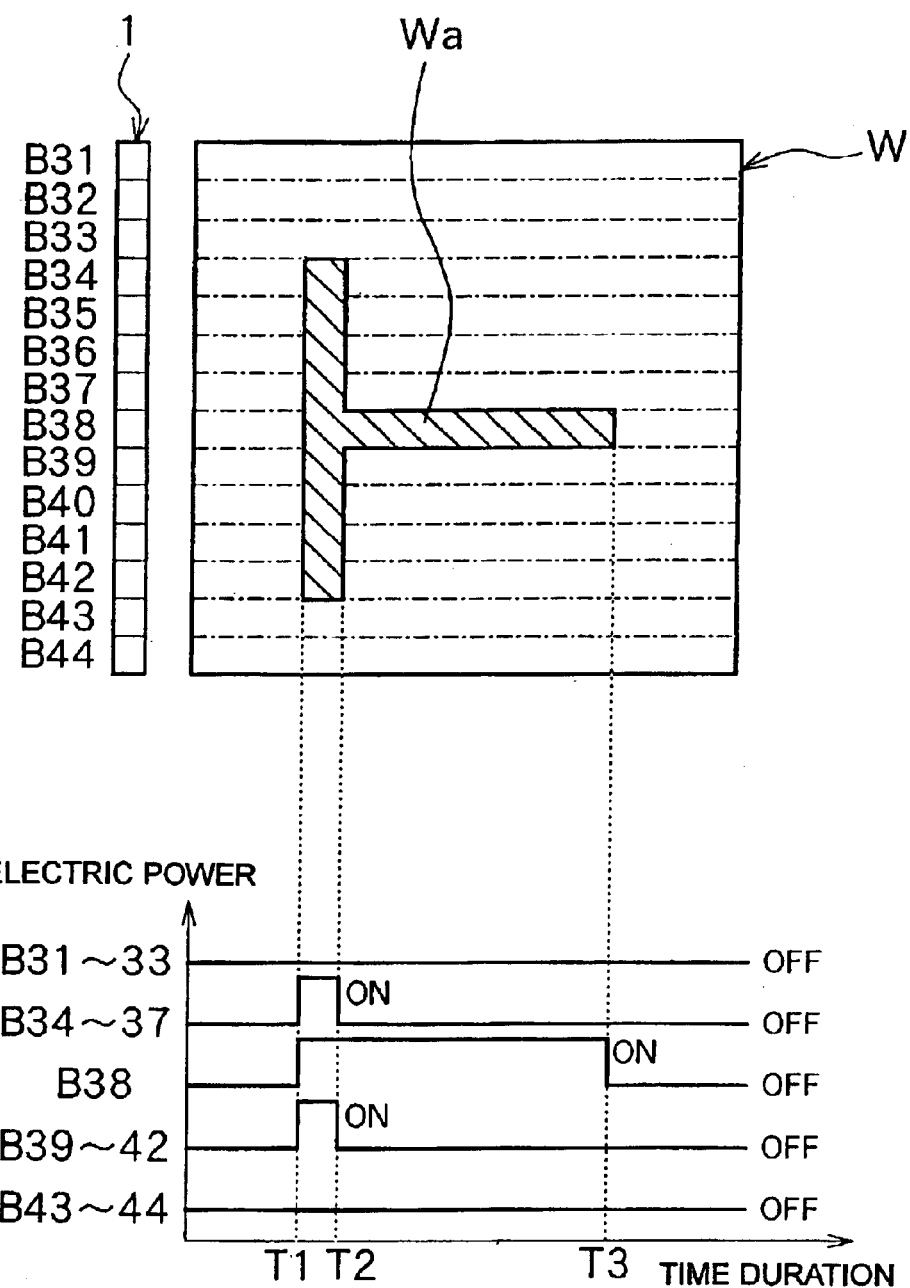
FIG. 10 is a conceptual diagram for illustrating still another embodiment of a semiconductor stack of the laser welding apparatus of the present invention and details of the control for performing marking.

In an embodiment shown in FIG. 10, a semiconductor stack 1 is formed in accordance with a width of a work piece W, and is divided into blocks B31 to B44 in such a manner that the blocks are arranged in a line along a width direction of the semiconductor stack 1. Further, a controller performs the ON/OFF control for the electric power to be supplied to each of the blocks B31 to B44. When a laser beam is emitted from a plurality of adjacent blocks B34 to B42, the controller sequentially changes the output of the laser beam emitted from the blocks B34 to B42 in terms of time so that it oscillates. In this state, the semiconductor stack 1 and the machining-target site Wa of the work piece W are relatively moved so as to perform a predetermined machining.

As shown in FIG. 10, in this embodiment, the laser beam is irradiated onto the surface of the work piece Wa, so that the color of the irradiated portion is changed into the color different from the portion which is not irradiated with the laser beam in order to give a marking on the irradiated portion. The electric power supplied from each of the power sources (their illustration is omitted) to the predetermined blocks B34 to B42 among the blocks B31 to B44 is set to the magnitude suitable for marking. When a substantially T-shaped marking is given onto the surface of the work piece W as the machining-target site Wa as shown in FIG. 10, no electric power is supplied to the blocks B31 to B33 and B43 to B44. On the other hand, when the semiconductor stack 1 reaches the machining-target site T1 as a result of the relative movement with respect to the work piece W, the electric power is sequentially supplied (ON) to the blocks B34 to B42 in such a manner that the output of the laser beam is changed between the adjacent blocks B34 to B42 in accordance with the elapse of time. Then, when the semiconductor stack 1 further reaches the machining-target site T2 as a result of the relative movement with respect to the work piece W, the supply of electric power to the blocks B34 to B37 and B39 to B42 is stopped (OFF) and the supply of electric power is continued only for the block B38. After that, when the semiconductor stack 1 reaches the machining-target site T3 as a result of the relative movement with respect to the work piece W, the supply of electric power to the block B38 is also stopped (OFF). The block B38 may further be divided into smaller blocks although its illustration is omitted, and the irradiation output of the laser beam may be controlled so as to change in terms of time within the block B38.

Figure 11:
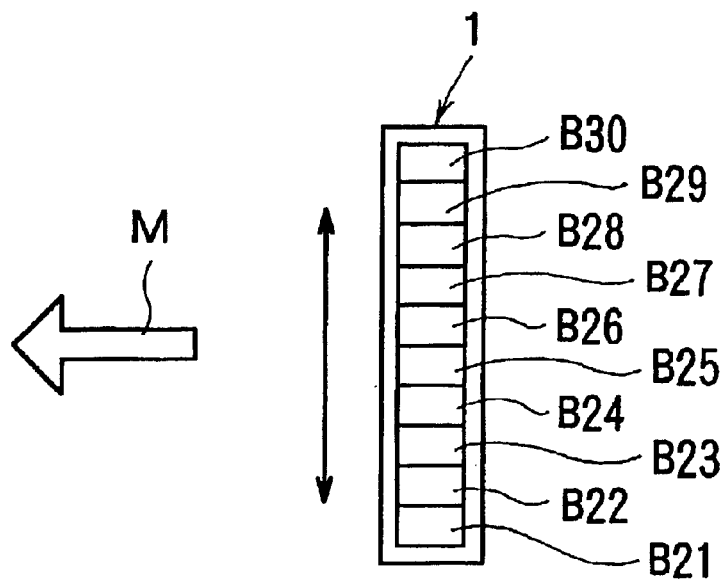
FIG. 11 is a conceptual diagram for illustrating an embodiment of the change of the semiconductor stack in terms of time and the machining direction (along the arrow) in the case where cladding buildup is carried out by employing a laser machining method of the present invention.
Figure 12:
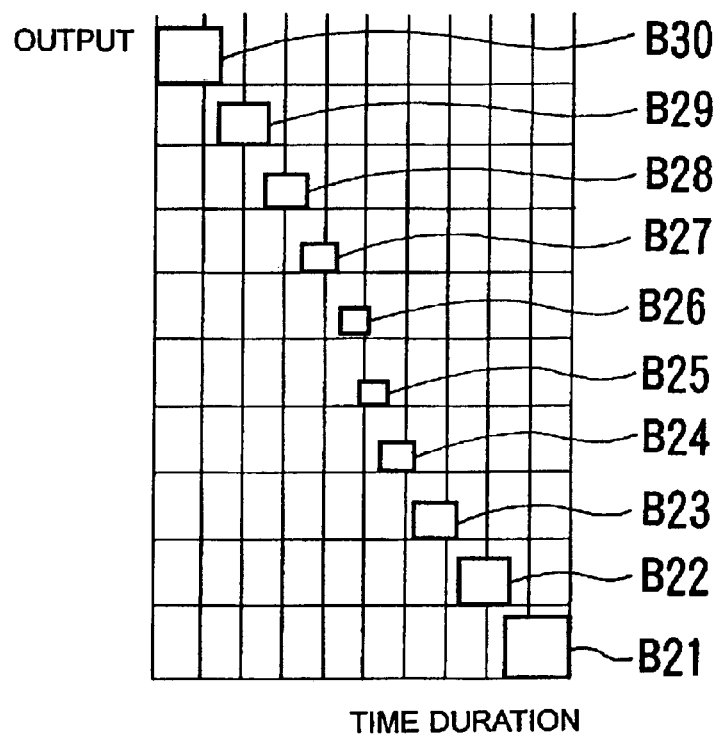
FIG. 12 is a conceptual diagram for illustrating an embodiment of the control of the semiconductor stack shown in FIG. 11.

FIGS. 11 to 13 show an embodiment where, as is the case of the embodiment shown in FIG. 7, a semiconductor stack 1 is formed in accordance with the width of a machining-target site Wa, and is divided into blocks B21 to B30 in such a manner that the blocks are arranged in a line along the width of the semiconductor stack 1, and cladding buildup is carried out by employing this structure. As is shown at a lower portion in FIG. 13, a clad powder material made of powder metal and the like is disposed as a buildup material onto a machining-target site Wa of a base material as a work piece W. An unillustrated controller controls the electric power to be supplied to each of the blocks B21 to B30 in such a manner that a laser beam L emitted from the adjacent blocks B30, B29, B28, . . . B23, B22, B21 is irradiated in a state where both of its output and irradiation time duration are changed as shown in FIG. 12. The laser beam L is sequentially irradiated in an oscillating manner in a state where its output is gradually decreased and also its irradiation time duration is shortened toward a center portion of the machining-target site Wa, in other words, its output is gradually increased and also its irradiation time duration is elongated toward the both end portions. As described above, since the heat is hard to be released at a center area of the molten portion of the base material, the molten portion tends to grow large, and the end portion thereof is easily cooled down because the heat is easily released. Contrarily in this embodiment, as is shown at an upper portion in FIG. 13, the output of the irradiated laser beam is controlled in such a manner that the output of the irradiated laser beam is relatively small at the center portion of the machining-target site Wa and is relatively large at the both end portions. Consequently, the difference in the temperatures from portion to portion in the machining-target site Wa is suppressed, and at the same time, the molten portion of the base material is formed into a uniform and proper depth in the width direction (in a left and right direction in FIG. 13). Therefore, there is no generation of a crack which has been caused in the prior art where the laser is irradiated to the buildup material at a uniform output (see FIG. 25) resulting in that the base material is diluted to cause the change in the composition of the buildup material and the increase in the hardness (compare FIG. 13 and FIG. 25). This control is applicable not only to cladding buildup, but also to a heat treatment such as quenching or the like. In addition, the control of the laser beam L emitted from the blocks B21 to B30 is not limited to the ON/OFF control of the output of the laser beam L as well as the control for elongating and shortening the irradiation time duration as described above; either one of the ON/OFF control or the control for elongating and shortening the irradiation time duration may be carried out, or the intensity varying control of the laser beam L may be combined or may be carried out alone.

Figure 14:
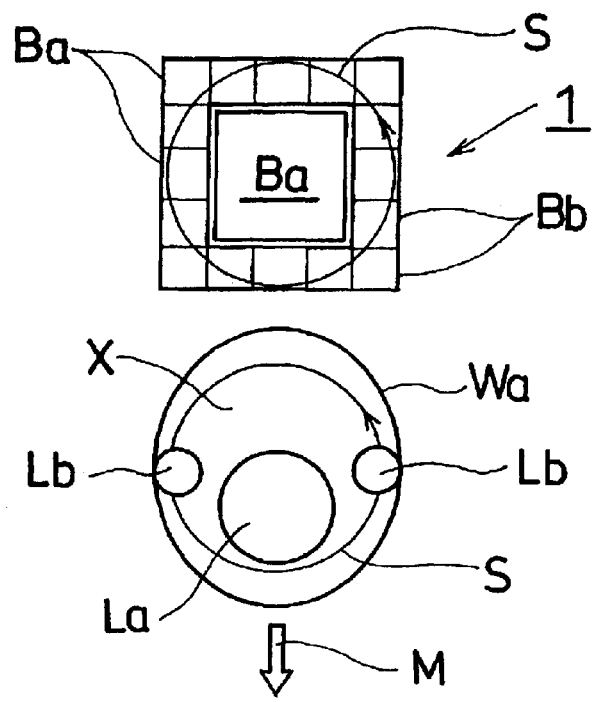
FIG. 14 is a conceptual diagram for illustrating an embodiment of the disposition of the semiconductor stack of the laser machining apparatus of the present invention and the laser beam irradiated therefrom.
Figure 15:
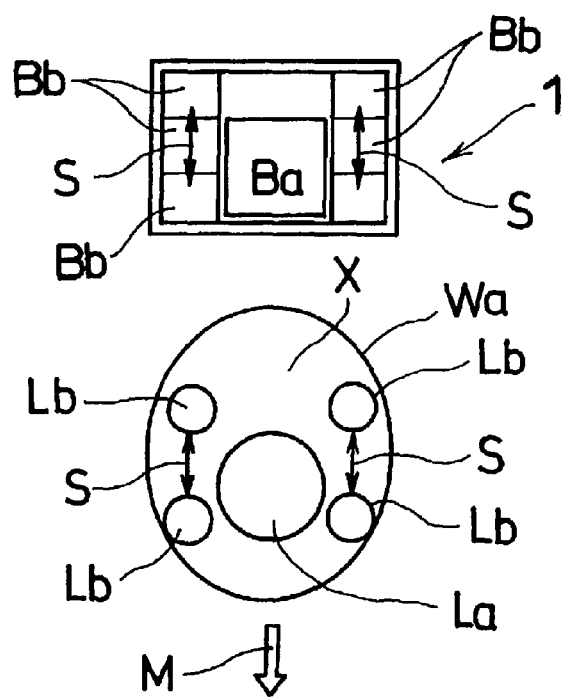
FIG. 15 is a conceptual diagram for illustrating another embodiment of the disposition of the semiconductor stack of the laser machining apparatus of the present invention and the laser beam irradiated therefrom.
Figure 16:
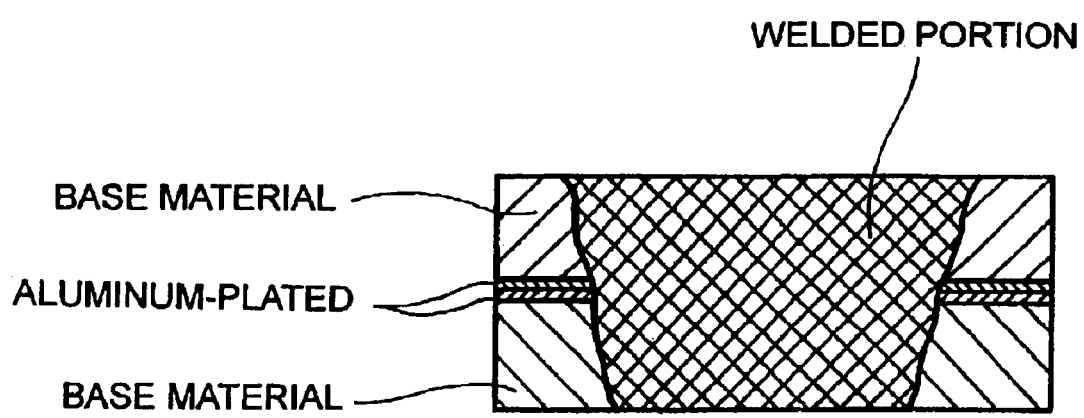
FIG. 16 is a diagram for illustrating a welded portion of aluminum plated steel sheets laminated and welded with each other according to the method of the present invention.

FIGS. 14 to 16 show an embodiment where a semiconductor module 1 is divided into a block Ba which continuously irradiates a laser beam La to a machining-target site Wa during machining and a block Bb which irradiates a laser beam Lb of which irradiation output is changed in terms of time, and aluminum plated steel sheets are laminated and welded with each other in a state where their aluminum plated layers are in contact with each other.

In a semiconductor module 1 of FIG. 14, as is shown at an upper portion in FIG. 14, a plurality of blocks Bb of which respective irradiation output is changed in terms of time are disposed so as to surround the block Ba which continuously irradiates the laser beam La. The blocks Bb are controlled in such a manner that they irradiate the laser beam Lb sequentially in a rotating manner so that it oscillates as shown by an arrow S in FIG. 14. As is shown at a lower portion in FIG. 14, the laser beam Lb emitted from the blocks Bb in an oscillating manner is not limited to be irradiated alone, but the blocks Bb may be controlled in such a manner that the laser beams Lb, Lb and so forth may be emitted from two or more of the blocks Bb.

In a semiconductor module 1 of FIG. 15, as is shown at an upper portion in FIG. 15, a plurality of blocks Bb of which respective irradiation output is changed in terms of time are disposed along the both side edges of a block Ba which continuously irradiates the laser beam La in parallel to the welding direction (an arrow M). The blocks Bb are controlled in such a manner that they sequentially irradiate the laser beam Lb in one direction repeatedly or in a reciprocal direction in an oscillating manner as shown by an arrow S in FIG. 15. In FIGS. 14 and 15, the arrow M shows a welding direction.

Figure 26:
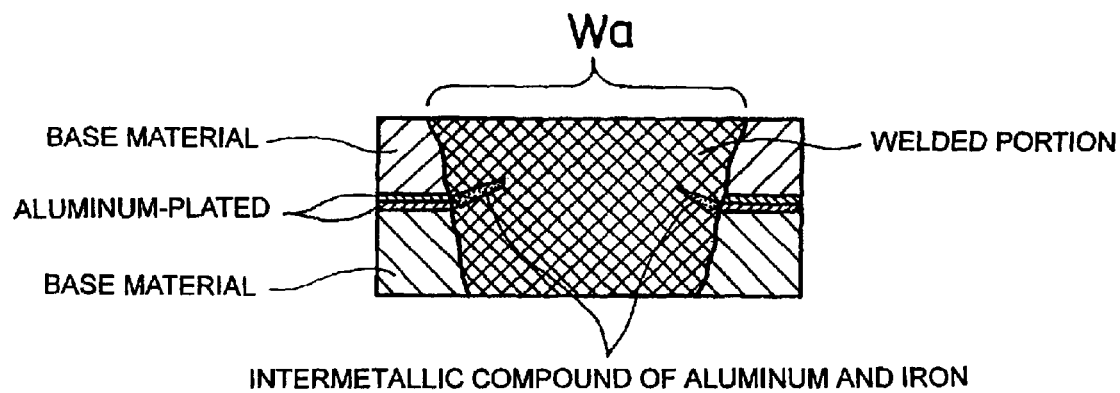
FIG. 26 is a diagram for illustrating a case where a laser beam is oscillated so as to be irradiated at a uniform output according to a prior art and aluminum plated steel sheets are laminated and welded with each other in a state where their aluminum plated layers are attached to each other.

As a result of the structure shown in FIG. 14 or FIG. 15, in a molten pool X formed in the machining-target site Wa, since the laser beam Lb is moved and irradiated so as to oscillate (the arrow s shown at the lower portion in FIGS. 14 and 15) around or along the side edges of the area irradiated with the laser beam La which is continuously irradiated, the molten metal receives a stirring effect. Due to this effect, even if the aluminum plated steel sheets are laminated and welded with each other in the state where their aluminum plated layers are in contact with each other as shown in FIG. 16, a state does not occur in which the aluminum plated layers in contact with each other are melted and segregated and therefore an intermetallic compound of aluminum and iron is produced as has been caused in the prior art (see FIG. 26). As a result, in this embodiment, the welded portion is formed in a proper state without being brittle. The control of the laser beam Lb emitted from the blocks Bb is not limited to the ON/OFF control of the output of the laser beam L as described above; the ON/OFF control may be carried out in combination with the control for elongating and shortening the irradiation time duration or the intensity varying control of the laser beam Lb, or any one of these controls may be carried out alone. Such a structure is not limited to a case where the aluminum plated steel sheets are laminated and welded with each other, but may be applied to other types of welding or cladding buildup, for example, to a heat treatment such as quenching.

FIGS. 17 to 20 shows an embodiment where a semiconductor module 1 is divided into a block Ba which continuously irradiates a laser beam La to a machining-target site Wa and a block Bb which irradiates a laser beam Lb of which irradiation output is changed in terms of time, and zinc plated steel sheets are laminated and welded with each other in a state where their zinc plated layers are in contact with each other. In FIGS. 17 to 20, an arrow M shows a welding direction. The structure of this embodiment differs from that of the embodiment shown in FIGS. 14 to 16 in that the block which continuously irradiates the laser beam La is disposed in front Ba and at rear Ba' in the welding direction, respectively, and a plurality of blocks Bb which are oscillated are disposed around both blocks Ba, Ba' including the area therebetween. In addition, the output of the laser beam La' emitted from the block Ba' disposed at the rear in the welding direction among the blocks Ba, Ba' which continuously irradiate the laser beam La is controlled so as to be lower than the output of the laser beam La emitted from the block Ba disposed in front.

Figure 17:
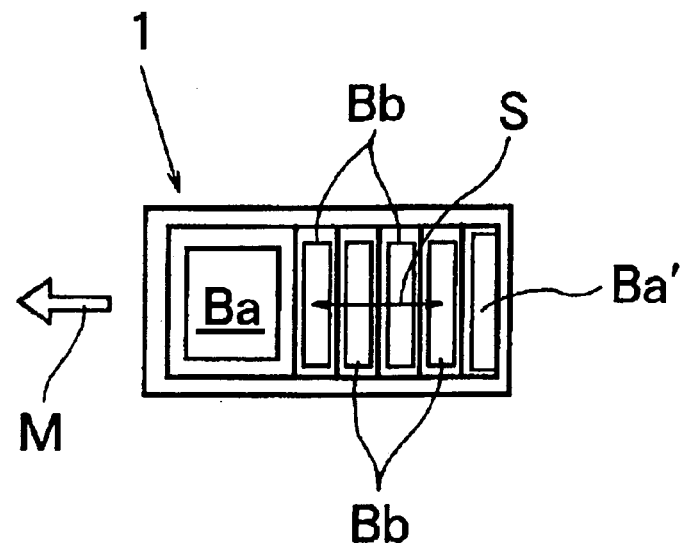
FIG. 17 is a diagram for illustrating another embodiment of the disposition of the semiconductor stack of the laser machining apparatus of the present invention and the change in the irradiated laser beam.

In a semiconductor module 1 of FIG. 17, a plurality of blocks Bb of which respective irradiation output is changed in terms of time are disposed between front and rear blocks Ba, Ba' which continuously irradiate the laser beams La, La', respectively. The blocks Bb are controlled so as to irradiate the laser beam Lb sequentially in an oscillating manner.

Figure 18:
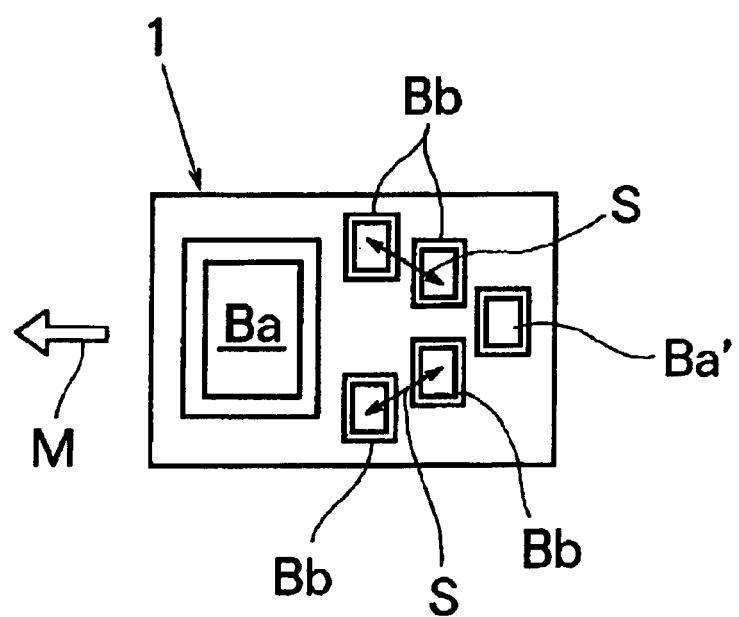
FIG. 18 is a diagram for illustrating another embodiment of the disposition of the semiconductor stack of the laser machining apparatus of the present invention and the change in the irradiated laser beam.

In a semiconductor module 1 of FIG. 18, a plurality of blocks Bb of which respective irradiation output is changed in terms of time are disposed between front and rear blocks Ba, Ba' which continuously irradiate the laser beams La, La', respectively. These blocks Bb are arranged in two lines, and in addition, are disposed so as to be inclined with respect to the welding direction in such a manner that the lines are apart from each other in front and are approaching toward each other at the rear.

Figure 19:
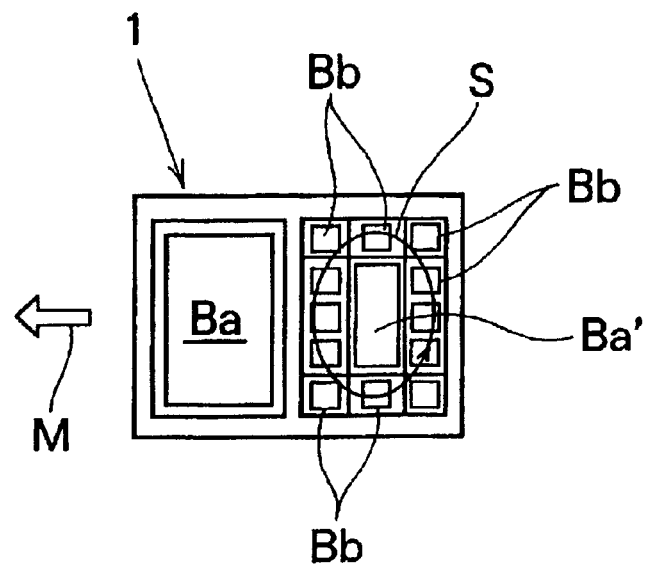
FIG. 19 is a diagram for illustrating another embodiment of the disposition of the semiconductor stack of the laser machining apparatus of the present invention and the change in the irradiated laser beam.

In a semiconductor module 1 of FIG. 19, a plurality of blocks Bb of which respective irradiation output is changed in terms of time are disposed so as to surround a rear block Ba' which continuously irradiates a laser beam La'.

Figure 20:
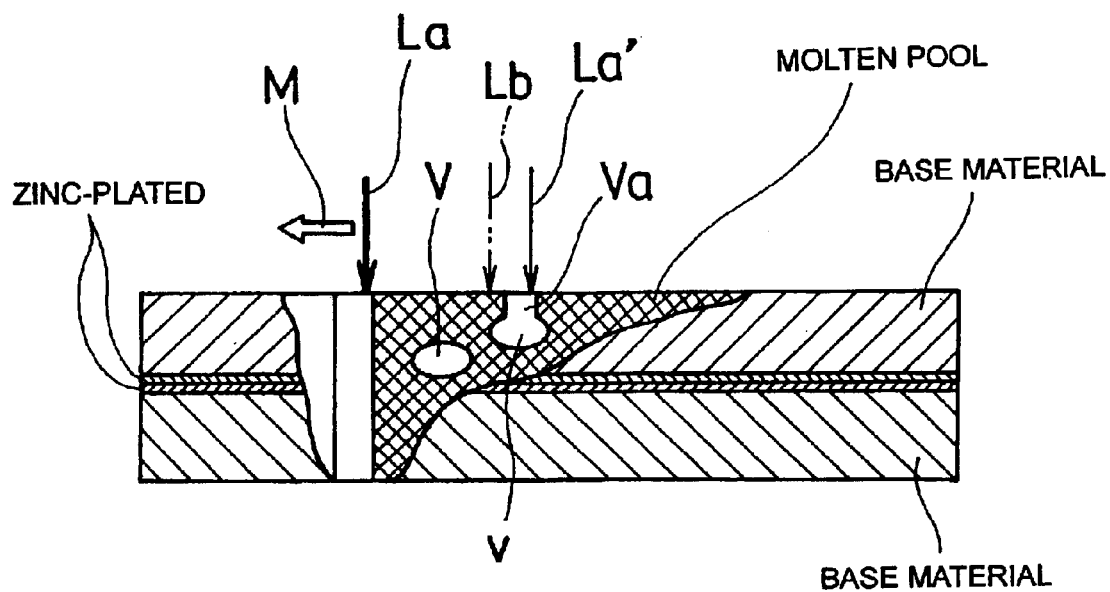
FIG. 20 is a diagram for illustrating a state where the molten pool is stirred at the rear in the machining direction according to the present invention and a hole for releasing gas from the bubble generated therein is formed in the bubble, thereby preventing the generation of a blowhole in the welded bead.
Figure 27:
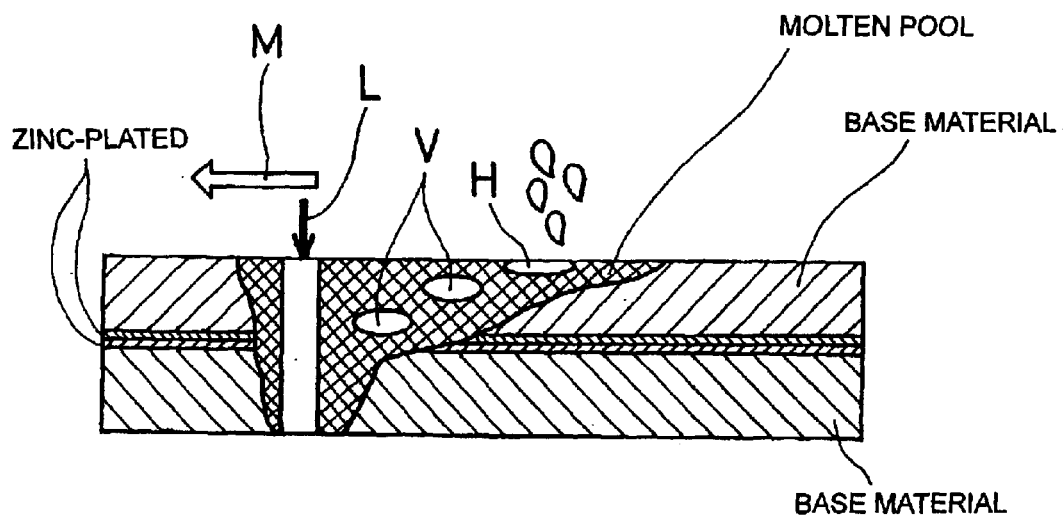
FIG. 27 is a diagram for illustrating a case where a laser beam is oscillated so as to be irradiated at a uniform output according to a prior art and zinc plated steel sheets are laminated and welded with each other in a state where their zinc plated layers are attached to each other.

In all of the embodiments of FIGS. 17 to 19, even if bubbles V are generated as a result of evaporation because of the low melting point of the zinc plated layer, as shown in FIG. 20, the laser beam La' is emitted from the block Ba' disposed at the rear so as to form the holes Va for releasing the gas of the bubbles V. In addition, the blocks Bb are controlled so as to irradiate the laser beam Lb in an oscillating manner, and as a result, the molten metal receives an effect of stirring at an area between or around the portions continuously irradiated with the laser beams La, La'. Therefore, even in the case where the zinc plated steel sheets are laminated and welded with each other, no bubbles V are blown off to create blowholes H in the welded portion at the rear of the welding pool X in the welding direction M, as has been caused in the prior art (see FIG. 27). The holes Va for releasing gas of the bubbles V formed by the laser beam La' disappear before the molten pool is solidified, since the bubbles V are filled with the molten metal of the molten pool X.

In this embodiment as well, the control of the laser beam Lb emitted from the blocks Bb is not limited to the ON/OFF control of the output of the laser beam L as describe above; the ON/OFF control may be carried out in combination with the control for elongating and shortening the irradiation time duration or the intensity varying control of the laser beam Lb, or any one of these controls may be carried out alone. Such a structure is not limited to a case where the zinc plated steel sheets are laminated and welded with each other, but may be applied to other types of welding or cladding buildup, for example, to a heat treatment such as quenching.

INDUSTRIAL APPLICABILITY

According to the present invention, it is possible to provide a laser machining apparatus in a simple structure which can properly carry out laser machining by irradiating a laser beam easily and precisely, in an oscillating manner, at a predetermined energy density and output as well as in a predetermined time duration to a machining-target site in a predetermined range, and in addition, which can be downsized and can be kept with easy maintenance and has enhanced durability.

In addition, according to the present invention, it is also possible to provide a method for properly carrying out laser machining by irradiating a laser beam at a predetermined energy density and output as well as in a predetermined time duration to a machining-target site in a predetermined range by a simple control.

What is claimed is:

1. A laser machining apparatus comprising:
   a semiconductor stack comprising a plurality of semiconductor laser elements which emit laser beams, the semiconductor stack being divided into a plurality of blocks from which irradiation output of the laser beams is outputted;
   a controller for controlling the irradiation output of the laser beam from each of the blocks so that the irradiation output of the laser beam from each of the blocks is changeable in terms of time; and
   a plurality of power sources each connected to a respective one of the blocks for supplying electric power to the respective block;
   wherein the plurality of blocks includes a block which continuously irradiates the laser beam and a block in which the irradiation output of the laser beam is changed in terms of time, and
   the block in which the irradiation output of the laser beam is changed in terms of time includes a plurality of blocks in which the respective irradiation output of the laser beam is changed in terms of time, the blocks in which the respective irradiation output of the laser beam is changed in terms of time being arranged to at least partially surround the block which continuously irradiates the laser beam.

2. A laser machining apparatus comprising:

a semiconductor stack comprising a plurality of semiconductor laser elements which emit laser beams, the semiconductor stack being divided into a plurality of blocks from which irradiation output of the laser beams is outputted;

a controller for controlling the irradiation output of the laser beam from each of the blocks so that the irradiation output of the laser beam from each of the blocks is changeable in terms of time; and a plurality of power sources each connected to a respective one of the blocks for supplying electric power to the respective block;

wherein the plurality of blocks includes a block which continuously irradiates the laser beam and a block in which the irradiation output of the laser beam is changed in terms of time, and the block in which irradiation output of the laser beam is changed in terms of time is positioned between two blocks which continuously irradiate the laser beam so that the two blocks which continuously irradiate the laser beam are disposed in front of and a rear of the block in which the irradiation output of the laser beam is changed in terms of time in a machining direction.

3. A laser machining method characterized in that a semiconductor stack comprising a plurality of semiconductor laser elements is divided into a plurality of blocks and an irradiation output of a laser beam is emitted from each of the blocks and is changed in terms of time by a controller, wherein the plurality of blocks includes blocks which continuously irradiate the laser beam and a block in which the irradiation output of the laser beam is changed in terms of time.

the blocks which continuously irradiate the laser beam being disposed in front of and a rear of the block in which the irradiation output of the laser beam is changed in terms of time in the machining direction, and the irradiation output of the block disposed at the rear in the machining direction is set lower than that of the block disposed at the front in the machining direction.

4. A laser machining method according to claim 3, wherein the irradiation output of the laser beam emitted from each of the blocks is sequentially changed between the adjacent blocks by the controller.

5. A laser machining method according to claim 4, wherein the irradiation output of a block which irradiates a laser beam to the side edge in the machining direction is set higher than to the center portion in the machining direction.

6. A laser beam machining method according to claim 4, wherein the irradiation time duration of a block which irradiates a laser beam to the side edge in the machining direction is set longer than to the center portion in the machining direction.

7. A laser machining method according to claim 3, wherein the laser machining is buildup machining where a buildup material is build up onto a base material.

8. A laser machining method according to claim 4, wherein the laser machining is buildup machining where a buildup material is build up onto a base material.

9. A laser machining method according to claim 5, wherein the laser machining is buildup machining where a buildup material is build up onto a base material.

10. A laser machining method according to claim 6, wherein the laser machining is buildup machining where a buildup material is build up onto a base material.

11. A laser machining method according to claim 3, wherein the laser machining is welding where sheet-like materials each including a plated base material are welded with each other.

12. A laser machining method according to claim 4, wherein the laser machining is welding where sheet-like materials each including a plated base material are welded with each other.

13. A laser machining method according to claim 5, wherein the laser machining is welding where sheet-like materials each including a plated base material are welded with each other.

14. A laser machining method according to claim 6, wherein the laser machining is welding where sheet-like materials each including a plated base material are welded with each other.

15. A laser machining method according to claim 11, wherein the sheet-like material is an aluminum plated steel sheet.

16. A laser machining method according to claim 11, wherein the sheet-like material is zinc plated steel sheet.

17. A laser machining method according to claim 12, wherein the sheet-like material is an aluminum plated steel sheet.

18. A laser machining method according to claim 12, wherein the sheet-like material is a zinc plated steel sheet.

19. A laser machining method according to claim 13, wherein the sheet-like material is an aluminum plated steel sheet.

20. A laser machining method according to claim 13, wherein the sheet-like material is a zinc plated steel sheet.

21. A laser machining method according to claim 14, wherein the sheet-like material is an aluminum plated steel sheet.

22. A laser machining method according to claim 14, wherein the sheet-like material is a zinc plated steel sheet.

* * * * *